United States Patent
Dorbie et al.

(10) Patent No.: US 10,621,707 B2
(45) Date of Patent: Apr. 14, 2020

(54) TABLE REPROJECTION FOR POST RENDER LATENCY COMPENSATION

(71) Applicant: Jeri J. Ellsworth, San Jose, CA (US)

(72) Inventors: Angus McDonald Dorbie, Redwood City, CA (US); Andrew T. McFadden, Sunnyvale, CA (US); Timothy Cotter, Sunnyvale, CA (US); Jamie Gennis, San Jose, CA (US); Jeri J. Ellsworth, San Jose, CA (US)

(73) Assignee: Tilt Fire, Inc, San Jose, CA (US)

( * ) Notice: Subject to any disclaimer, the term of this patent is extended or adjusted under 35 U.S.C. 154(b) by 35 days.

(21) Appl. No.: 16/010,311

(22) Filed: Jun. 15, 2018

(65) Prior Publication Data

US 2018/0365815 A1 Dec. 20, 2018

Related U.S. Application Data (60) Provisional application No. 62/520,780, filed on Jun. 16, 2017.

(51) Int. Cl.
| | |
|---|---|
| *G06T 3/00* | (2006.01) |
| *G06T 5/00* | (2006.01) |
| *G06T 11/00* | (2006.01) |
| *G06T 11/60* | (2006.01) |
| *G02B 27/01* | (2006.01) |

(52) U.S. Cl.
CPC ............ *G06T 5/006* (2013.01); *G06T 3/00* (2013.01); *G06T 11/001* (2013.01); *G06T 11/60* (2013.01); *G02B 27/0172* (2013.01); *G02B 2027/014* (2013.01); *G02B 2027/0178* (2013.01)

(58) Field of Classification Search
CPC .............................. G02B 27/01; G02B 27/017
See application file for complete search history.

(56) References Cited

U.S. PATENT DOCUMENTS

| | | | | |
|---|---|---|---|---|
| 5,796,426 A | * | 8/1998 | Gullichsen | G06T 3/0018 348/147 |
| 2012/0092328 A1 | * | 4/2012 | Flaks | G02B 27/017 345/419 |
| 2014/0340424 A1 | | 11/2014 | Ellsworth | |
| 2016/0238852 A1 | | 8/2016 | Ellsworth | |
| 2016/0277725 A1 | | 9/2016 | Ellsworth | |
| 2017/0330496 A1 | * | 11/2017 | Oravainen | A63F 13/211 |
| 2018/0004002 A1 | | 1/2018 | Rong | |

OTHER PUBLICATIONS

Mark, William R. Leonard McMillan, and Gary Bishop. "Post-rendering 3D warping." Proceedings of the 1997 symposium on Interactive 3D graphics. ACM, 1997.

Hua, Hong, et al. "Engineering of head-mounted projective displays." Applied Optics 39.22 (2000) 3814-3824.

(Continued)

*Primary Examiner* — Mark K Zimmerman
*Assistant Examiner* — Jonathan M Cofino
(74) *Attorney, Agent, or Firm* — Ken Clements (57) ABSTRACT

System and method for low latency correction of projection errors due to view point movement in a virtual or augmented reality context of head-mounted projected image displays such as glasses or goggles worn on the head of a user which project images onto a retro-reflective surface for return to the eyes of said user.

1 Claim, 8 Drawing Sheets

(56) References Cited

OTHER PUBLICATIONS

Smit, Ferdi, et al. "An image-warping architecture for vr: Low latency versus image quality." Virtual Reality Conference, 2009. VR 2009. IEEE. IEEE, 2009.

Lavalle, Steven M. et al. "Head tracking for the Oculus Rift" Robotics and Automation (ICRA), 2014 IEEE International Conference on. IEEE, 2014.

* cited by examiner

TABLE REPROJECTION FOR POST RENDER LATENCY COMPENSATION

This application claims the benefits of U.S. provisional patent application Ser. No. 62/520,780 filed Jun. 16, 2017, which is incorporated in its entirety.

INCORPORATION BY REFERENCE

The following patent(s) and publications are each hereby incorporated by reference for all patent purposes:

U.S. PATENT DOCUMENTS

US 2014/0340424 SYSTEM AND METHOD FOR RECONFIGURABLE PROJECTED AUGMENTED/VIRTUAL REALITY APPLIANCE
US 2016/0238852 HEAD MOUNTED DISPLAY FACILITATING POST RENDER PROCESSING
US 2016/0277725 RETROREFLECTIVE LIGHT FIELD DISPLAY
US 2018/0004002 HMPD WITH MULTILAYER BEAM SPLITTER AND COLOR CORRECTION

OTHER PUBLICATIONS

Mark, William R., Leonard McMillan, and Gary Bishop. "Post-rendering 3D warping." *Proceedings of the 1997 symposium on Interactive* 3D graphics. ACM, 1997.
Hua, Hong, et al. "Engineering of head-mounted projective displays." Applied Optics 39.22 (2000): 3814-3824.
Smit, Ferdi, et al. "An image-warping architecture for VR: Low latency versus image quality." *Virtual Reality Conference,* 2009. *VR* 2009. *IEEE*. IEEE, 2009.
LaValle, Steven M., et al. "Head tracking for the Oculus Rift," *Robotics and Automation (ICRA)*, 2014 *IEEE International Conference on*. IEEE, 2014.

FIELD OF THE INVENTION

The present invention relates to head-mounted projected image displays (HMPD) such as glasses or goggles worn on the head of a user (see Ellsworth US2014/0340424) which project images onto a retro-reflective surface for return to the eyes of said user. More particularly, the present invention relates to the rendering of said images for low latency correction of projection errors due to view point movement in a virtual or augmented reality (VR or AR) context.

DESCRIPTION OF THE RELATED ART

Those skilled in the virtual and augmented reality display arts will be familiar with the general problem of keeping displays synchronized with user view point movement such that the latency associated with image frame update can be made small enough to avoid nausea and other visual discomfort associated with slow update displays. These problems have been well documented and addressed for so call "phone holder" type head mounted displays such as the Samsung Gear-VR and Google Daydream. A well know method of seeming to speed up rendering in these systems is post render warping, or "reprojection" (see Mark et al.). In this technique the image frame from the most recent full render of the user's view is "warped" or otherwise modified to approximate the changes a full render would produce to compensate for the measured movement of the user's view point. This modified image can then be sent back to the image projectors much sooner than a full scene render can be finished. Although well known in the near-eye head mounted display art, in the current invention, this method can be modified to operate faster and over more head movement in the special configuration experienced in the HMPD where a retroreflective surface is on a table top in front of a user and the virtual images are essentially rendered at that surface.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In order to render (draw) a scene in AR or VR, the position of the eye is calculated prior to image projection. However, during the time it takes to render the eye may be repositioned through user movement such that the resulting render is stale by the time it is complete; in addition, other effects such as latency in computing view position may contribute to this delay. Once complete, even with prediction of movement, there will be errors in the calculated view position due to the necessary time delay essential for rendering. Ideally one would want to reproject the scene to correct the final presented image for the new view position and orientation. That reprojection requires detailed depth information but can be approximated for information on a plane and many of the rendered scene parts or games are expected to render content on the plane of the game board/table. In addition, three of the 6 degrees of freedom are independent of the scene geometry and generally helped and compensated for regardless of the scene contents.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 1—Old eye pose and new eye pose with projection onto the plane
FIG. 2—Screen space reprojection illustration
FIG. 3—Vector generation from coordinates u, v
FIG. 4—Intersection of vectors with plane of interest
FIG. 5—Graduated border around projected image
FIG. 6—Projection of points on the Plane into new screen space
FIG. 7—Chart of flow inside the vertex shader for dewarp
FIG. 8—Diagram of system embodiment of current invention

DETAILED DESCRIPTION

Figure 1:
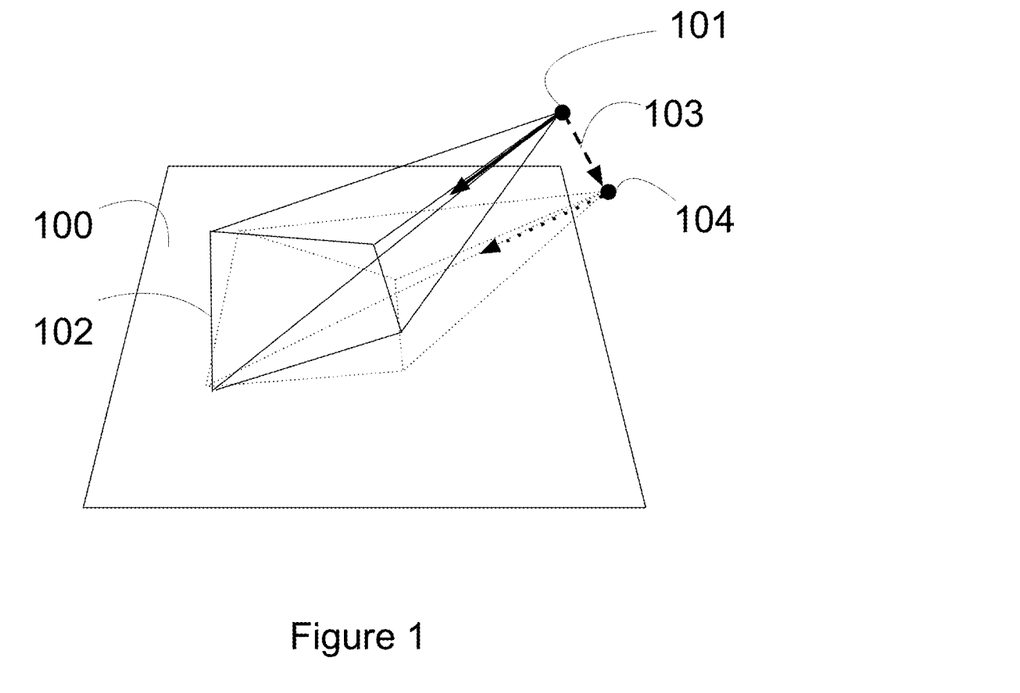

This description will consider each eye independently of the other for the purpose of reprojection. The reprojection may simply be performed for each eye in isolation. It is further assumed that the plane of correct reprojection is the table surface. It need not be this surface and indeed there may be other reprojection solutions for situations where the content is not coincident with the surface. It is important to understand that reprojection in this instance is about the content and is unrelated to the retroreflective display surface. It is, without limitation, an exemplary embodiment in which content lies on this display surface and this has additional benefits such as convergence more closely matching accommodation. So considering a single eye and with the assumption that content lies on the plane of interest, the geometry of reprojection is as follows:

The current invention is to transform the image of the plane in one projection into the equivalent plane section of the other projection. Inevitably this may cause discarding of pixels not visible in the new view but also may cause some missing pixels in the new projection that were not drawn in the original projection. FIG. 1 shows the 3D spatial relationship, but in texture space the transformation output is closer to 2D although there are perspective transformations and rasterization involved due to the geometry shown.

Reprojection (correcting the projected image without re-rendering) is best performed as late as possible just prior to video presentation but at the same time must be complete in time for presentation. Fortunately, this can be combined with dewarp operations to correct imperfections in associated physical optics. By manipulating texture coordinates, that remain linear in screen and projection space, the algorithm is not impacted by optical effects or the dewarp correction of those effects. Additionally, a gradual fade to transparency near the border of the original image may be added to provide a more pleasing appearance in areas for which the original image is missing pixel data needed by the reprojected image.

Many Operating Systems have a video presentation subsystem that describes which image rectangles are transferred to video, often supporting layered compositing operations. These systems have efficient hardware compositing modes that simply describe rectangles that are transferred and composited on the fly as video pixels are generated. They also have fallback modes where hardware accelerated GPU operations are used to perform the equivalent of blits (image block transfers) often using texture hardware operations and supporting additional effects such as blending, convolution and masking (with alpha) may enhance these transfers, all accelerated by hardware. An example of such a compositing and video presentation subsystem is Android's SurfaceFlinger. The dewarp and reprojection stage of the current invention is directly integrated into SurfaceFlinger. This means that when the Operating System triggers a vsync interrupt for the video transfer operation it can trigger the late reprojection at the ideal time. Reprojection then fetches the latest eye pose information and applies that pose to the graphics shader used for reprojection. The dewarp and reprojection is then performed as an integral part of the image rectangle transfer from the rendered framebuffer to the video output buffer as a fully integrated part of the buffer compositing and video presentation subsystem.

Figure 2:
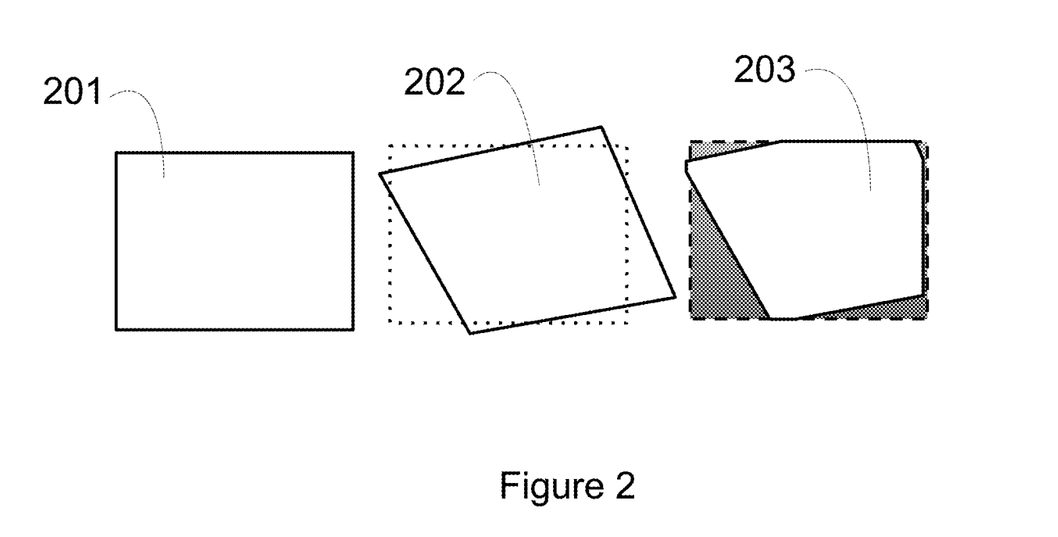

As shown in FIG. 1, the image 102 from the old view point 101 is projected onto the plane of interest 100 and then reprojected into the image plane of the new projector at position 104, in order to compensate for viewpoint movement 103. As an example, FIG. 2 shows a view 201 from the old eye position, a reprojection of the old in the new 202 and finally the output of the new view 203.

In practice there are several mathematically equivalent systems that can achieve this. An embodiment is to implement the reprojection in a vertex texture shader without any recourse to additional passes; this does not mean that this is the most optimal solution or the only mathematical solution. A practical low risk solution may be implemented in a reasonable amount of time with available information and known math in a vertex shader with a small performance overhead while avoiding the need to add undesirable steps, such as additional texturing operations. Basically it grafts right into the dewarp shader at minimal cost.

Figure 3:
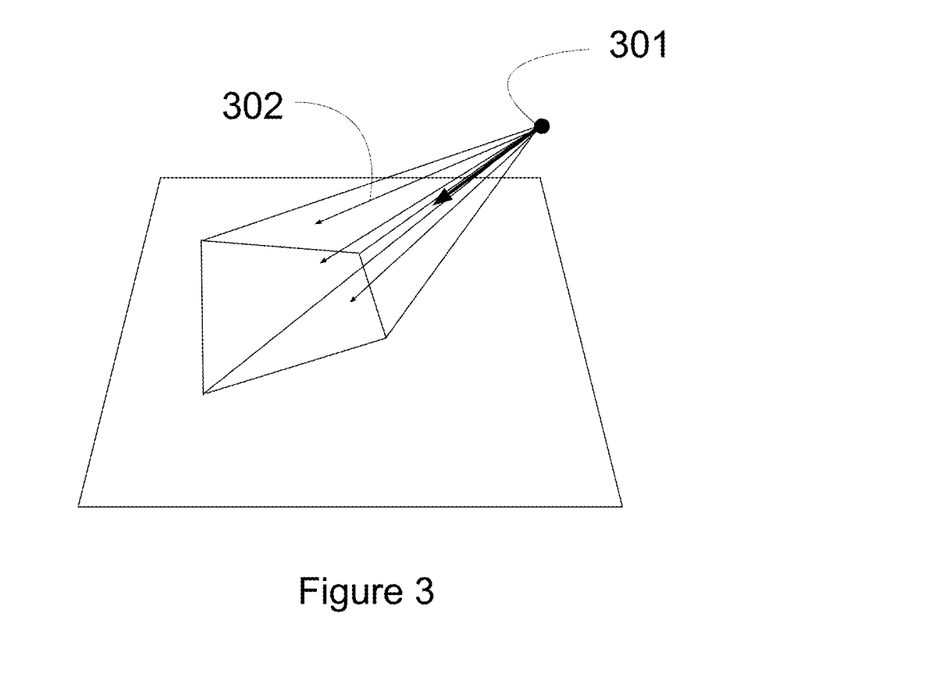

FIG. 3 shows step 1. From the view point 301, for each dewarp vertex generate a suitable vector in world/table space (e.g. 302). This vector will use the unique u,v, of the texture map normalized to the −1, +1 projection space and transformed through the inverse projector intrinsics matrix and then transformed through the new eye pose matrix. This produces a world space point which forms a ray from the eye to each point.

Figure 4:
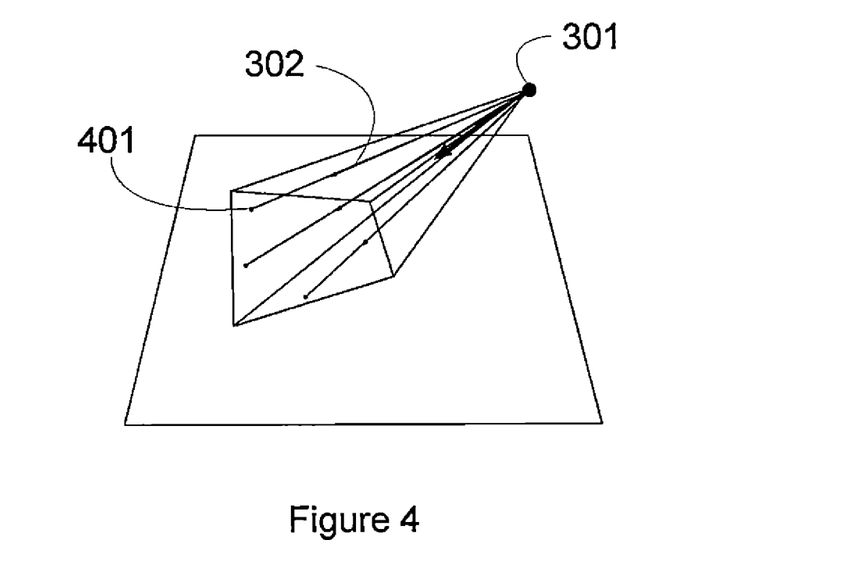

FIG. 4 shows step 2. At each vertex the ray (e.g. 302) from the eye 301 is intersected with the plane of the content (e.g. point 401). Typically, this is coincident with the plane of the table; it should be noted, however, that the plane of the table is not the only geometry applicable. If, for example, a spherical virtual surface is used in a world mapping application, then that may be a preferred reprojection intersection geometry for this pipeline stage. It is the virtual CONTENT surface, or surfaces, that matter for reprojection in this implementation NOT the retroreflective surface, and of course there may be a full reprojection including fragment Z that would be rather rigorous, but not perfect due to occlusion effects etc.

Figure 5:
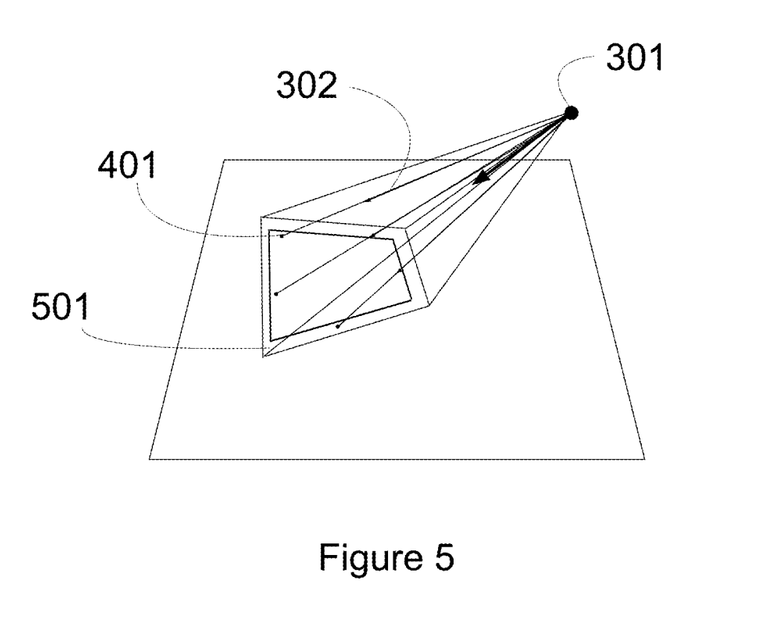

FIG. 5 shows step 3. An attenuation is determined for each point to create a graduated border 501 around the projected image. This attenuation can be applied to the fetched render texture sample in the dewarp shader. The attenuation transitions from fully opaque on the interior of the projected image to fully transparent at the border. There are numerous fall-off curves that may be used to compute the attenuation, but typically a low-order polynomial is used such as a linear or cubic function. This border softens the visual transition between pixel data that is available in the original image and that which is unavailable but needed to create the reprojected image.

Figure 6:
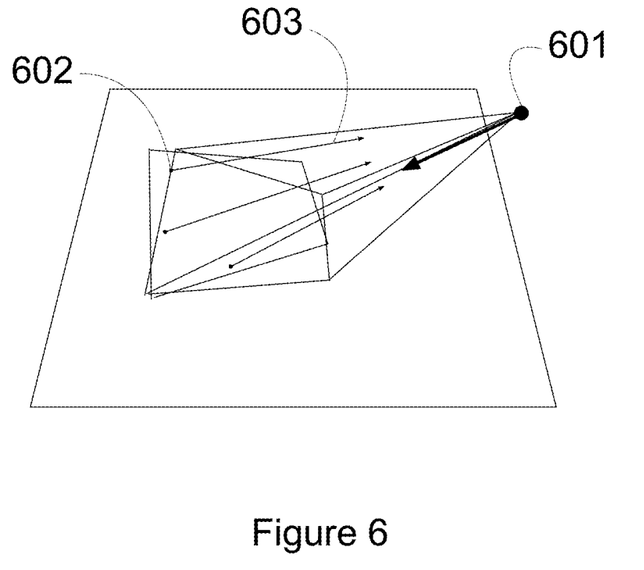

FIG. 6 shows step 4, the final step where each point on the plane of interest (e.g. 602) is projected back into the new screen space (e.g. ray 603) using the pose and projection matrix of the original eye pose 601. After the post projection homogeneous divide, these result in −1, +1 coordinates which are then mapped to the relevant texture space for the render texture sample fetch used by the dewarp shader.

Figure 7:
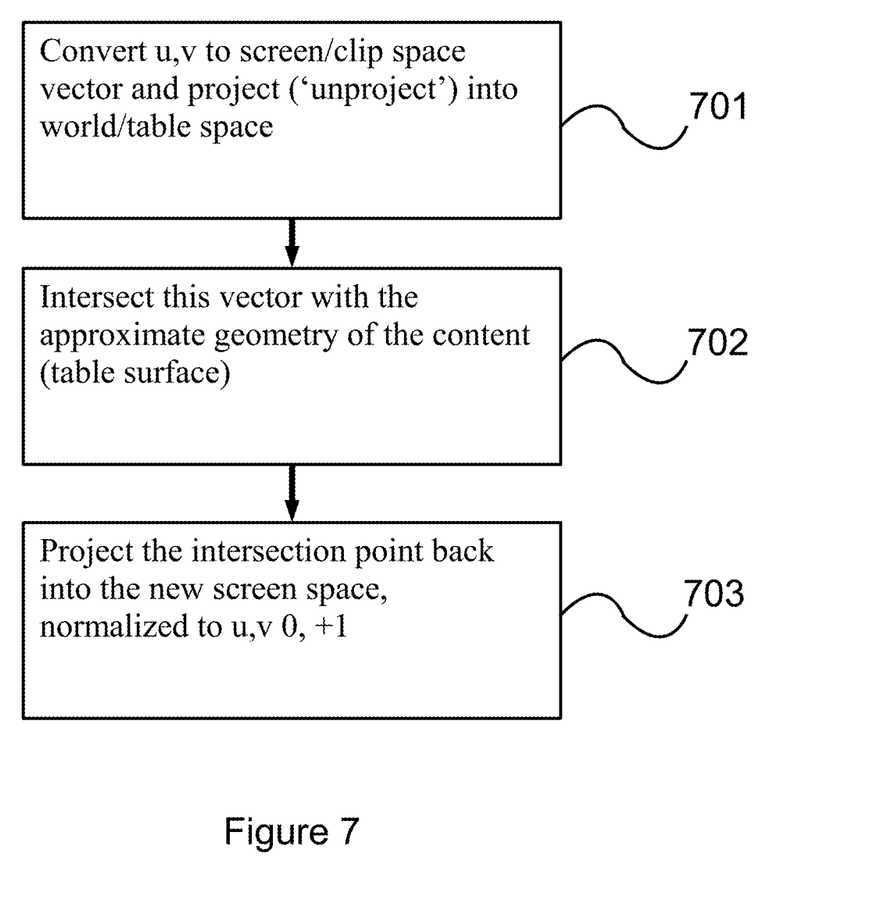

FIG. 7 summarizes the flow inside the vertex shader for dewarp, as operations: 701 convert u,v to screen/clip space vector and project ('unproject') into world/table space, 702 intersect this vector with the approximate geometry of the content (table surface), 703 project the intersection point back into the new screen space, normalized to u,v 0, +1.

All three steps of FIG. 7 could be combined into a single matrix operation if the ray intersection of step two becomes a projective transformation of the world space vector onto the plane with a matrix multiply.

Subsequently, in a pixel or fragment shader, the render texture can be sampled and the border attenuation applied.

Figure 8:
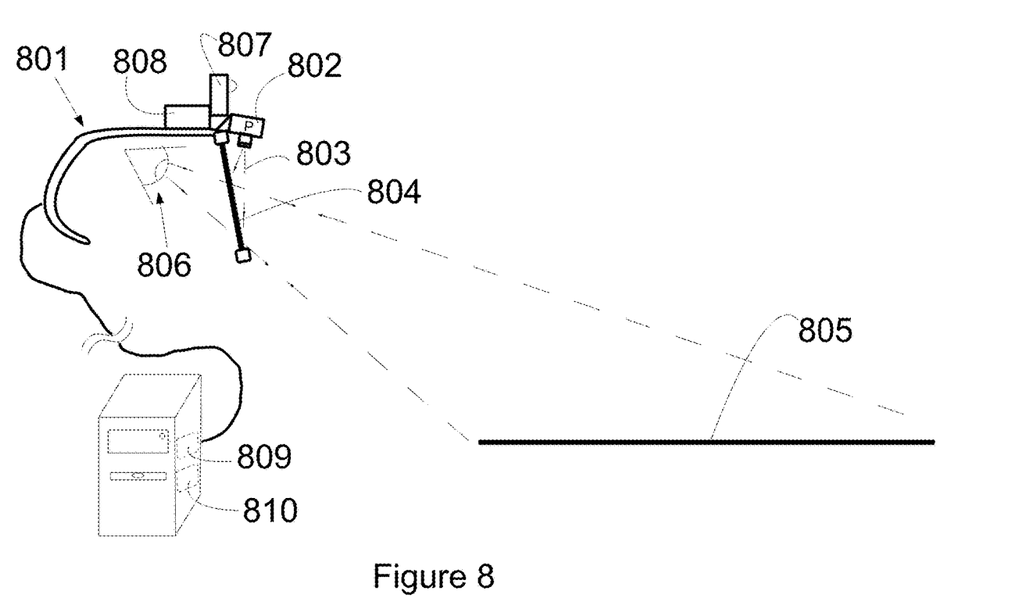

FIG. 8 shows a system embodiment of the current invention (see Wei Rong et al. US 2018/0004002), comprising a head mounted projection frame 801 with projector(s) 802 directing images 803 to beam splitting reflective lenses 804 where reflection directs images to retroreflective surface 805. Images are returned from surface 805 to user eye(s) 806. Head tracking motion sensing unit 807 sends changes in view position to reprojection processor 808 which also receives rendered image data from GPU processor 809 in coordination with CPU 810. Reprojected images are then sent to projector(s) 802 for display. Those skilled in the art will understand the improvement of performance the current invention adds to the system of FIG. 8 by reduction of apparent frame rendering latency.

CONCLUSION

An illustrative embodiment has been described by way of example herein. Those skilled in the art will understand, however, that change and modifications may be made to this embodiment without departing from the true scope and spirit of the elements, products, and methods to which the embodiment is directed, which is defined by our claims.

That which is claimed:

1. In a head mounted projected display for augmented reality, a method to correct for movement of point of view of virtual figures, or objects, by reprojection comprising the steps:
   (a) providing a point of view from calculation of eye or head pose;
   (b) providing an image rendered from said pose;
   (c) providing a plane of interest for projection of virtual images;
   (d) intersecting the last most recent rendered image, as projected, with an approximation of the virtual object surface(s), said intersecting comprising the sub-steps:
      (d1) providing a set of dewarp vertices mapped across an image space, and
      (d2) generating a world space vector from said dewarp vertices, and
      (d3) intersecting each said vector with said plane of interest;
   (e) mathematically projecting intersection points back into the new screen space, said projecting comprising the sub-steps:
      (e1) providing a new point of view from calculation or prediction of a new eye or head pose, and
      (e2) projecting said intersection set back into a new screen space using said new point of view, and
      (e3) mapping said back projection as a texture and presenting a new image from said texture for viewing.

* * * * *

UNITED STATES PATENT AND TRADEMARK OFFICE
CERTIFICATE OF CORRECTION

Page 1 of 1

PATENT NO.         : 10,621,707 B2
APPLICATION NO.    : 16/010311
DATED              : April 14, 2020
INVENTOR(S)        : Dorbie et al.

It is certified that error appears in the above-identified patent and that said Letters Patent is hereby corrected as shown below:

On the Title Page

Assignee item (73) should read:
Tilt Five, Inc. San Jose, CA (US)

Signed and Sealed this
Fourth Day of August, 2020

Andrei Iancu
*Director of the United States Patent and Trademark Office*